(12) United States Patent
Dam et al.

(10) Patent No.: US 9,494,253 B2
(45) Date of Patent: Nov. 15, 2016

(54) FLOW CONTROL VALVE WITH PRESSURE BALANCING

(75) Inventors: Bjarke Skovgard Dam, Almind (DK); Hans Kurt Petersen, Egtved (DK)

(73) Assignee: DANFOSS A/S, Nordborg (DK)

( * ) Notice: Subject to any disclaimer, the term of this patent is extended or adjusted under 35 U.S.C. 154(b) by 433 days.

(21) Appl. No.: 14/346,395

(22) PCT Filed: Sep. 14, 2012

(86) PCT No.: PCT/DK2012/000102
§ 371 (c)(1),
(2), (4) Date: Mar. 21, 2014

(87) PCT Pub. No.: WO2013/044915
PCT Pub. Date: Apr. 4, 2013

(65) Prior Publication Data
US 2014/0223944 A1 Aug. 14, 2014

(30) Foreign Application Priority Data

Sep. 26, 2011 (DK) .................................. 2011 00734

(51) Int. Cl.
*F16K 39/02* (2006.01)
*F25B 41/06* (2006.01)

(52) U.S. Cl.
CPC ............ *F16K 39/022* (2013.01); *F25B 41/062* (2013.01)

(58) Field of Classification Search
CPC ..... F25B 41/06; F25B 41/062; F16K 39/022
USPC ....................................................... 236/92 B
See application file for complete search history.

(56) References Cited

U.S. PATENT DOCUMENTS

| 4,763,874 A | 8/1988 | Ogawa |
| 4,911,404 A | 3/1990 | Dorste et al. |

(Continued)

FOREIGN PATENT DOCUMENTS

| EP | 1 857 748 A1 | 11/2007 |
| JP | 2008 051347 A | 3/2008 |

OTHER PUBLICATIONS

Danish Search Report Serial No. PA201100734 dated May 1, 2012.
(Continued)

*Primary Examiner* — Marc Norman
(74) *Attorney, Agent, or Firm* — McCormick, Paulding & Huber LLP

(57) ABSTRACT

A flow control valve (1) for a refrigeration system is disclosed. The valve (1) comprises a valve port (14) having a substantially cylindrical inner circumference arranged to receive a protruding portion of a valve member (5). The valve member (5) comprises a protruding portion having a substantially cylindrical outer circumference corresponding to the inner circumference of the valve port (14), said protruding portion also having at least one fluted part (16), said at least one fluted part (16) defining fluid passage along the at least one fluted part (16) when the valve member (5) is in the open position. The valve member (5) is provided with at least one first fluid passage (6) extending through the valve member (5) between a second valve chamber (15) and a pressure balancing chamber (8), and at least one second fluid passage (7) establishing a fluid connection between a first valve chamber (12) and the first fluid passage (6). The second fluid passage (7) has an opening arranged on the substantially cylindrical part of the protruding portion of the valve member (5). The invention allows the pressure of the balancing chamber (8) to be adjusted independently of the primary flow through the valve (1), via the fluted parts(s) (16).

18 Claims, 5 Drawing Sheets

(56) References Cited

U.S. PATENT DOCUMENTS 6,289,930 B1 * 9/2001 Simon .................. F16K 31/406
137/601.14
6,568,656 B1 5/2003 Wrocklage
9,285,038 B2 * 3/2016 Xu .......................... F16K 3/246

OTHER PUBLICATIONS

International Search Report for PCT Serial No. PCT/DK2012/000102 dated Nov. 13, 2012.

* cited by examiner

FLOW CONTROL VALVE WITH PRESSURE BALANCING

CROSS REFERENCE TO RELATED APPLICATIONS

This application is entitled to the benefit of and incorporates by reference subject matter disclosed in International Patent Application No. PCT/DK2012/000102 filed on Sep. 14, 2012 and Danish Patent Application No. PA 2011 00734 filed Sep. 26, 2011.

FIELD OF THE INVENTION

The present invention relates to a flow control valve, e.g. an expansion valve, for a refrigeration system. The flow control valve of the invention comprises a pressure equalization passage for reducing the force required for operating the valve, i.e. for balancing the valve.

BACKGROUND

When a flow control valve is arranged in a flow path, a pressure difference is introduced between the inlet side and the outlet side of the valve. As a result a force acts on the valve member in the direction of the fluid flow through the valve. Depending on the design of the valve, the force introduced by the pressure difference may push the valve member towards an open position or towards a closed position. If the force pushes the valve member towards the open position, a constant actuation force must be applied to the valve member when the valve is closed, in order to prevent that the force introduced by the pressure difference causes the valve to leak. On the other hand, if the force pushes the valve member towards the closed position, a large actuation force is required for opening the valve, because the force introduced by the pressure difference must be overcome by the actuation force.

In order to solve the problems described above, some flow control valves are balanced by interconnecting the low pressure side of the valve with a pressure balancing chamber which is in contact with a portion of the valve member. Thereby the resulting force on the valve member, due to the pressure difference, is reduced.

U.S. Pat. No. 6,568,656 discloses a flow control valve for a refrigeration system. The valve includes a body having an inlet, an outlet, a communicating passage between the inlet and outlet, the passage having a valve seat. The valve includes a piston chamber and a piston mounted in the piston chamber for movement toward and away from the valve seat. The piston includes an equalization passage, extending between an upper port communicating with the piston chamber, and a lower port. The lower port is arranged in a conical portion of the piston, along which the fluid flow through the valve takes place, when the valve is in the open position.

U.S. Pat. No. 4,911,404 discloses an expansion valve assembly for a refrigeration system. The valve assembly includes a valve body having an upper portion, an intermediate portion providing a valve chamber and a valve port, and a lower portion. A valve inlet and outlet communicate with the valve chamber on each side of the valve port. A piston assembly is mounted in the body for closing the valve port. The piston assembly includes a fluted nose portion and a bleed passage. The bleed passage is arranged in a fluted part of the nose portion.

SUMMARY

It is an object of embodiments of the invention to provide a flow control valve in which the risk of leaks is minimized, when the valve is in the closed position.

It is a further object of embodiments of the invention to provide a flow control valve in which it is not required to apply an actuation force while the valve is in the closed position.

It is an even further object of embodiments of the invention to provide a flow control valve in which a balancing force can easily be controlled in an accurate manner.

According to a first aspect the invention provides a flow control valve for a refrigeration system, the valve comprising:
a valve body defining a fluid inlet, a fluid outlet and a fluid passage between said fluid inlet and said fluid outlet,
a valve port having a substantially cylindrical inner circumference arranged to receive a protruding portion of a valve member,
a first valve chamber arranged at a first side of the valve port, and in fluid connection with the fluid inlet,
a second valve chamber arranged at a second, opposite, side of the valve port, and in fluid connection with the fluid outlet,
a valve member arranged in an interior part of said valve body, said valve member comprising a protruding portion having a substantially cylindrical outer circumference corresponding to the inner circumference of the valve port, said valve member being movable between a closed position, thereby preventing a fluid flow from the first valve chamber to the second valve chamber, and an open position in which such a fluid flow is allowed, said protruding portion also having at least one fluted part, said at least one fluted part defining fluid passage along the at least one fluted part when the valve member is in the open position,
wherein the valve member is provided with at least one first fluid passage extending through the valve member between the second valve chamber and a pressure balancing chamber, and at least one second fluid passage establishing a fluid connection between the first valve chamber and the first fluid passage, said second fluid passage having an opening arranged on the substantially cylindrical part of the protruding portion of the valve member.

In the present context the term 'flow control valve' should be interpreted to mean a valve which is capable of controlling a flow of fluid through the valve. Thus, the flow control valve may be in a closed position, in which the flow control valve prevents a fluid flow from passing through the valve, or in an open position in which the flow control valve allows a fluid flow through the valve. Furthermore, when the flow control valve is in the open position, the valve may further be capable of controlling the flow rate of fluid through the valve, and the valve may be capable of adjusting the opening degree in order to obtain a desired flow rate.

In the present context the term 'refrigeration system' should be interpreted to mean a system in which a flow of fluid medium, such as refrigerant, circulates and is alternatingly compressed and expanded, thereby providing either refrigeration or heating of a volume. Thus, the refrigeration system may, e.g., be a system used for household refrigeration, or for refrigeration furniture in a supermarket, an air condition system, a heat pump, etc.

The flow control valve comprises a valve body defining a fluid inlet, a fluid outlet and a fluid passage between the fluid inlet and the fluid outlet. Thus, fluid may enter the flow control valve via the fluid inlet, pass through the valve via the fluid passage, and leave the valve via the fluid outlet.

The flow control valve further comprises a valve port. The valve port is preferably arranged in the fluid passage. Fluid passing through the valve, as described above, passes through the valve port. The valve port has a substantially cylindrical inner circumference arranged to receive a protruding part of a valve member. This will be described in further detail below.

Furthermore, the flow control valve comprises a first valve chamber and a second valve chamber. The first valve chamber is arranged at a first side of the valve port, in fluid connection with the fluid inlet, and the second valve chamber is arranged at a second, opposite, side of the valve port, in fluid connection with the fluid outlet. Thus, fluid passing through the valve passes through the fluid inlet, enters the first valve chamber, passes through the valve port, enters the second valve chamber, and leaves the valve via the fluid outlet.

A valve member is arranged in an interior part of the valve body. The valve member comprises a protruding portion having a substantially cylindrical outer circumference corresponding to the inner circumference of the valve port. Thus, the valve member 'matches' the valve port in the sense that the valve member fits into the cylindrical inner circumference of the valve port. Thereby the position of the valve member relative to the valve port determines the fluid flow through the valve port, and thereby through the valve.

The valve member is movable between a closed position in which fluid flow through the valve port is prevented, and an open position in which fluid flow through the valve port is allowed. In the open position, it may further be possible to adjust the opening degree of the valve as described above.

The protruding portion of the valve member also has at least one fluted part. The at least one fluted part defines fluid passage through the valve port, and along the fluted part(s) when the valve member is in the open position. Thus, when the valve member is in the open position, the fluid flowing through the valve passes through a passage defined between the inner circumference of the valve port and a fluted part of the valve member.

The valve member is further provided with at least one first fluid passage extending through the valve member between the second valve chamber and a pressure balancing chamber. During operation, the fluid pressure at the fluid inlet is higher than the fluid pressure at the fluid outlet. Accordingly, the pressure at the first valve chamber is higher than the pressure at the second valve chamber, and a pressure difference exists across the valve port. The pressure difference pushes the valve member either towards the open position or towards the closed position, depending on the design of the flow control valve and on the direction of the fluid flow through the valve. If the pressure difference pushes the valve member towards the open position, there is a risk that the valve leaks in the closed position. On the other hand, if the pressure difference pushes the valve member towards the closed position, the actuation force required to open the valve may be very high. The first fluid passage extending through the valve member partly solves this problem, because the first fluid passage ensures that the low pressure of the second valve chamber is also present at the pressure balancing chamber. The pressure balancing chamber is arranged in such a manner that the low pressure of the balancing chamber counteracts the forces acting on the valve member due to the pressure difference. For instance, the pressure balancing chamber may be arranged at an end of the valve member, said end being arranged opposite to the protruding portion.

The valve member is further provided with at least one second fluid passage establishing a fluid connection between the first valve chamber and the first fluid passage. The second fluid passage ensures that the pressure in the pressure balancing chamber is slightly higher than the pressure in the second valve chamber when the valve member is in the open position. This has the effect that the pressure equalization is no longer complete, and the resulting force operating on the valve member due to the pressure difference is increased as compared to a solution where the second fluid passage is not present. This has the effect that vibrations of the valve member are avoided. Furthermore, if the flow control valve is designed so that the force on the valve member due to the pressure difference pushes the valve member towards the closed position, it is ensured that the resulting force is sufficient to ensure that the valve is tight in the closed position.

The second fluid passage has an opening which is arranged at the substantially cylindrical part of the protruding portion of the valve member. This means that the opening of the second fluid passage is not arranged at a fluted part of the protruding portion. Thereby the opening is arranged at a part which does not form part of the primary flow path through the valve port. This is an advantage, because the fluid flow through the second fluid passage is thereby completely independent of the primary fluid flow through the valve, which takes place via the fluted part(s). This allows the fluid flow through the second fluid passage to be controlled very accurately, and in order to meet specific requirements, e.g. regarding type of fluid, state of fluid (liquid and/or gaseous), pressure differences, etc.

The valve member may further have a groove in a region of the outer circumference comprising the opening of the second fluid passage. The groove provides a fluid supply to the opening, and thereby to the second fluid passage, even if the valve member is in a position where the opening is not in direct fluid contact with the first valve chamber.

The groove may be tapered, in which case the amount of fluid supplied to the opening, in the manner described above, depends on the position of the valve member relative to the closed position and the open position of the valve port. Thus, design of the groove allows the fluid flow through the second fluid passage, and thereby the resulting force operating on the valve member, to be controlled accurately as a function of the position of the valve member.

The groove may extend along a substantially axial direction of movement of the valve member between the closed position and the open position. According to this embodiment, the amount of fluid supplied to the opening, via the groove, depends on the position of the valve member along the direction of movement.

The fluted part(s) of the protruding portion of the valve member may have a substantially parabolic shape. According to this embodiment, the flow rate of fluid flowing through the valve depends on the position of the valve member relative to the valve port, because the opening(s) defined between the fluted part(s) and the inner circumference of the valve port increases when the valve member is moved away from the closed position. The parabolic shape ensures a desired relationship between position of the valve member and flow rate.

The first valve chamber and the valve port may be defined by an element which is detachably mounted on the flow control valve. According to this embodiment, surfaces of the valve are protected during operation of the valve, and also during assembly of the valve. Furthermore, because the element is detachable, it is easy to perform maintenance on or replace the element, and reliable operation of the valve is thereby ensured.

Fluid flow from the fluid inlet to the first valve chamber may take place via one or more cut-outs formed in a wall part of the element. According to this embodiment, the cut-outs forms a filter, removing impurities from the fluid flowing through the valve, before such impurities reach the rest of the refrigeration system. Furthermore, since the element is detachable, it is easy to clean the filter.

The cut-outs may, e.g., be slits or slots. Slits or slots can easily be cut in the element, and slits or slots are therefore advantageous from a manufacturing point of view. As an alternative, the cut-outs may be circular holes drilled in the wall part of the element, or the cut-outs may have any other suitable shape.

The flow control valve may further comprise an actuator for movement of the valve element. The actuator may be of any suitable kind, e.g. an electric actuator. The actuator may, e.g., include a threaded spindle transforming a rotational movement of the actuator into a linear movement of the valve member.

According to a second aspect, the invention provides a valve member for a flow control valve, said valve member comprising a protruding portion having a substantially cylindrical outer circumference corresponding to an inner circumference of a valve port, said protruding portion having at least one fluted part, wherein the valve member is provided with at least one first fluid passage extending through the valve member, and at least one second fluid passage establishing a fluid connection between the outer circumference of the valve member and the first fluid passage, said second fluid passage having an opening arranged on the substantially cylindrical part of the protruding portion of the valve member.

The valve member according to the second aspect of the invention is suitable for use in a flow control valve according to the first aspect of the invention. The remarks above are therefore equally applicable to the second aspect of the invention.

According to a third aspect the invention provides a refrigeration system comprising a compressor, a condenser, an evaporator and a flow control valve according to the first aspect of the invention, said flow control valve being arranged to control a flow of fluid supplied to the evaporator.

It should be noted that a person skilled in the art would readily recognize that any feature described in combination with the first aspect of the invention could also be combined the second or third aspect of the invention, that any feature described in combination with the second aspect of the invention could also be combined with the first or third aspect of the invention, and that any feature described in combination with the third aspect of the invention could also be combined with the first or second aspect of the invention.

The refrigeration system according to the third aspect of the invention may advantageously be operated in the following manner. The compressor, the condenser, the flow control valve and the evaporator are arranged in a refrigerant flow path, in which a suitable refrigerant flows. The refrigerant is compressed in the compressor. The compressed refrigerant is supplied to the condenser, where the refrigerant is at least partly condensed, and refrigerant leaving the condenser is substantially in a liquid phase. The refrigerant then passes through the flow control valve, where the refrigerant is expanded. The expanded refrigerant is supplied to the evaporator, where the refrigerant evaporates, before the refrigerant is once again supplied to the compressor, and the cycle is repeated. Heat exchange takes place at the condenser as well as at the evaporator. At the condenser, heat exchange results in heat being rejected from the refrigeration system, and heat exchange with the condenser provides heating for a volume. At the evaporator, heat exchange results in heat being supplied to the refrigeration system, and heat exchange with the evaporator provides refrigeration for a volume.

The flow control valve controls the supply of refrigerant to the evaporator. The supply of refrigerant may advantageously be controlled in accordance with a superheat control strategy. In this case the superheat of refrigerant leaving the evaporator is measured, and the supply of refrigerant to the evaporator is controlled for obtaining a superheat value which is zero or close to zero and positive. A positive superheat ensures that liquid refrigerant is not allowed to pass through the evaporator and reach the compressor. If liquid refrigerant is supplied to the compressor, the liquid refrigerant can damage the compressor, and liquid refrigerant supplied to the compressor is therefore undesirable. On the other hand, a very high superheat value indicates that the refrigerant is heated as well as evaporated in the evaporator. Thereby some of the energy consumed in the evaporator is used for heating the refrigerant, and the efficiency of the refrigeration system is poor. Accordingly, a small but positive superheat value indicates that the refrigeration system is operated with optimum efficiency without risking damage to the compressor.

The refrigerant flowing in the refrigerant path may advantageously be $CO_2$. As an alternative, the refrigerant may be any other suitable kind of refrigerant, such as R134a, R404A, R407A, R407B, R407C or R410C.

BRIEF DESCRIPTION OF THE DRAWINGS

The invention will now be described with reference to the accompanying drawings, in which.

DETAILED DESCRIPTION

Figure 1:
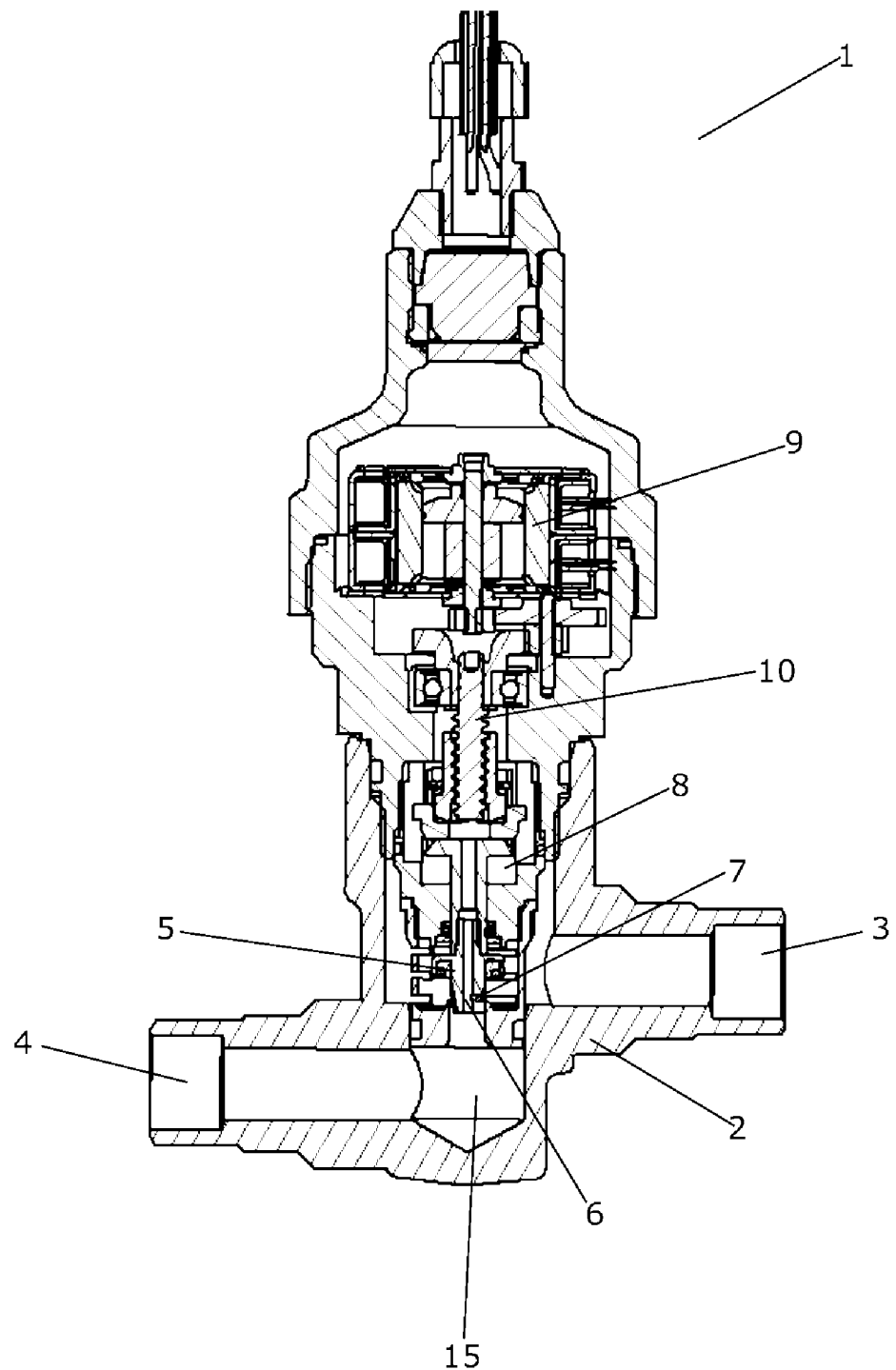
FIG. 1 is a cross sectional view of a flow control valve according to an embodiment of the invention.

FIG. 1 is a cross sectional view of a flow control valve 1 according to an embodiment of the invention. The flow control valve 1 comprises a valve body 2 defining a fluid inlet 3 and a fluid outlet 4. A valve member 5 is arranged movably in an interior part of the valve body 2 in a manner which will be described in further detail with reference to FIGS. 2-4. The valve member 5 may be in a closed position in which a fluid flow from the fluid inlet 3 to the fluid outlet 4 is prevented, or in an open position in which such a fluid flow is allowed.

A first fluid passage 6 extends substantially axially through the valve member 5, and a second fluid passage 7 extends through the valve member 5 between the first fluid passage and a side of the valve member 5. The first fluid passage 6 interconnects the low pressure side of the valve 1 with a pressure balancing chamber 8, and the second fluid passage 7 interconnects the high pressure side of the valve 1 with the first fluid passage 6. This will be described in further detail below. An actuator 9 causes movements of the valve member 5 via a spindle 10.

Figure 2:
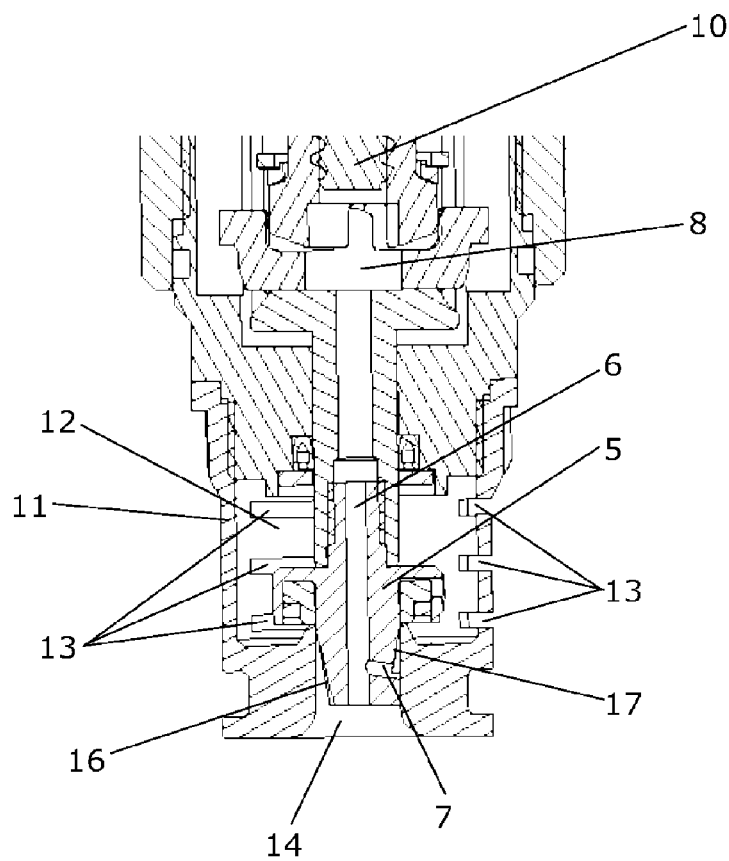
FIGS. 2-4 are perspective views of a part of the flow control valve of FIG. 1, in three different positions.
Figure 3:
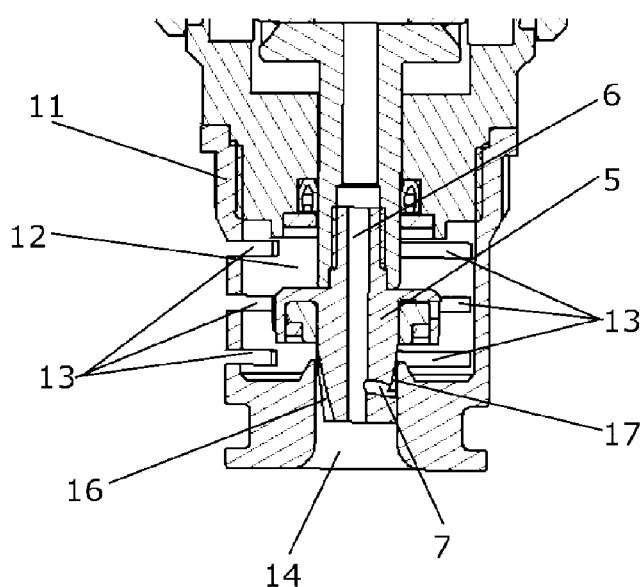
Figure 4:
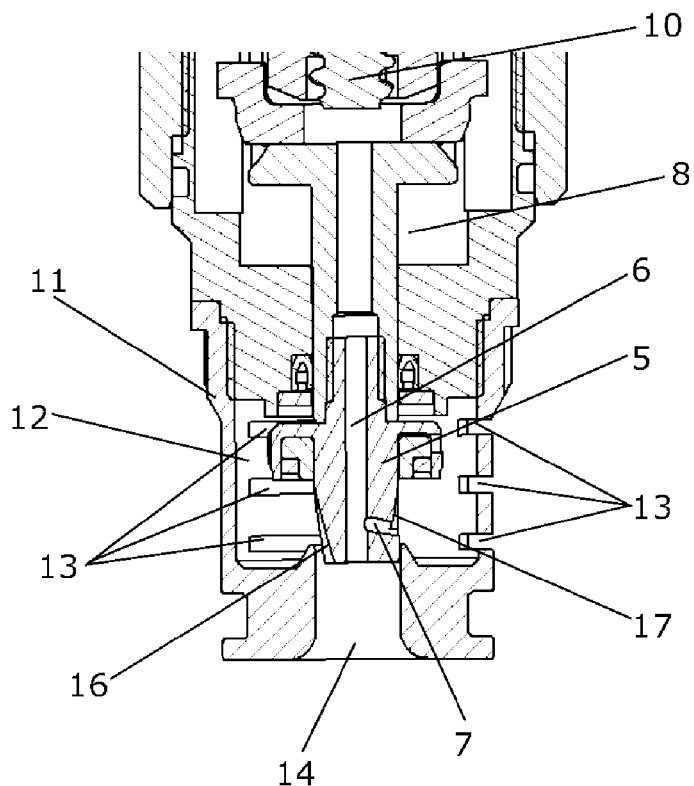

FIGS. 2-4 are cross sectional views of a part of the flow control valve 1 of FIG. 1, illustrating the movements of the valve member 5 during operation. Thus, in FIG. 2 the valve member 5 is in a closed position, in FIG. 3 the valve member 5 is in a partly open position, and in FIG. 4 the valve member 5 is in a fully open position.

An element 11 which is detachably mounted on the valve defines a first valve chamber 12 which is fluidly connected to the fluid inlet (not visible in FIGS. 2-4), via a number of cut-outs 13. The cut-outs 13 provide a filtering function, preventing large impurities from entering the first valve chamber 12. The element 11 further defines a valve port 14 with a cylindrical inner circumference. The valve port 14 is fluidly connected to a second valve chamber 15 (shown in FIG. 1), which is further fluidly connected to the fluid outlet (not visible in FIGS. 2-4). Thus, the pressure in the first valve chamber 12 is substantially identical to the pressure of fluid entering the valve via the fluid inlet, and the pressure in the second valve chamber 15, and in the part of the valve port 14 which is below the valve member 5, is substantially identical to the pressure of fluid leaving the valve via the fluid outlet. Accordingly, the pressure in the first valve chamber 12 is higher than the pressure in the second valve chamber 15, and thereby a pressure difference exists across the valve port 14.

The valve member 5 has a protruding portion which is arranged in the valve port 14. The protruding portion has a substantially cylindrical outer circumference, and thereby matches the cylindrical inner circumference of the valve port 14. The protruding portion is also provided with three fluted parts 16, one of which is visible. The fluted parts 16 have a parabolic shape. Other shapes similar to a parabolic shape, or even other geometrical shapes, may be possible instead. The second fluid passage 7 has an opening which is arranged at a cylindrical part of the protruding portion, i.e. the opening is not arranged at a fluted part 16. A tapered groove 17 is formed in the surface region of the opening of the second fluid passage 7.

In FIG. 2 the valve member 5 is arranged in abutment with an upper part of the valve port 14. The fluted part 16, the opening of the second fluid passage 7, and the tapered groove 17 are all arranged in the valve port 14. Thereby fluid is prevented from flowing from the first valve chamber 12 to the second valve chamber 15, via the valve port 14, because the valve member 5 is arranged in a fully closed position. The first fluid passage 6 ensures that the pressure in the pressure balancing chamber 8 is identical to the pressure in the second valve chamber 15. The high pressure in the first valve chamber 12 pushes the valve member 5 in a direction towards the valve port 14, and towards a closed position. However, since the same pressure occurs in the second valve chamber 15 and in the pressure balancing chamber 8, a part of the valve member 5, corresponding to the diameter of the valve port 14, is balanced, and the high pressure only acts on an annular part of the valve member 5 arranged beyond the diameter of the valve port 14. The resulting force acting on the valve member 5 is reduced as compared to a situation where the first fluid passage 6 is not present. Thereby the force required for opening the valve is reduced. However, the resulting force is still positive, thereby ensuring that the valve member 5 remains in the closed position, and the valve is tight.

In FIG. 3 the valve member 5 has been moved in an upwards direction, thereby arranging a portion of the fluted part 16 in fluid connection with the first valve chamber 12. As an effect, fluid is now allowed to flow from the first valve chamber 12 towards the second valve chamber 15, along the fluted part 16, and the valve member 5 is arranged in a partly open position. Furthermore, a portion of the tapered groove 17 is arranged in fluid connection with the first valve chamber 12, thereby allowing high pressure fluid to flow from the first valve chamber 12 to the first fluid passage 6, via the tapered groove 17 and the second fluid passage 7. Due to a portion of the tapered groove 17 being arranged in fluid connection with the first valve chamber 12, the pressure in the pressure balancing chamber 8 is increased slightly, and is thereby slightly higher than the pressure in the second valve chamber 15. This increases the resulting force on the valve member 5 in the direction towards the closed position. On the other hand, the high pressure of the first valve chamber 12 acts on the fluted parts 16 of the valve member 5, thereby providing a force which pushes the valve member 5 in a direction away from the closed position. The resulting force acting on the valve member 5 is still positive in the direction towards the closed position, but the resulting force is balanced in such a manner that the force required for moving the valve member 5 in a direction away from the closed position, towards larger opening degree, is not excessive.

The fluted parts 16 and the tapered groove 17 are designed in such a manner that the further away from the closed position the valve member 5 is moved, the higher the flow rate through the fluted part 16 as well as through the tapered groove 17 and the second fluid passage 7, since larger portions of the fluted parts 16 and of the tapered groove 17 are exposed to the high pressure. Thus, moving the valve member 5 simultaneously changes the opening degree of the valve, adjusts the force acting on the fluted parts 16 by the high pressure, and adjusts the pressure in the pressure balancing chamber 8.

It is an advantage that the tapered groove 17 and the opening of the second fluid passage 7 are arranged at a cylindrical part of the valve member 5, because this provides the possibility of designing the tapered groove 17 in order to adjust the pressure in the balancing chamber 8, and thereby the resulting force acting on the valve member 5, in a desired manner, without consideration to the flow rate of fluid through the valve, via the fluted parts 16.

In FIG. 4 the valve member 5 has been moved further in a direction away from the closed position, and the valve member 5 is now in a fully open position. It is evident from FIG. 4 that a larger portion of the fluted parts 16 is now in fluid connection with the first valve chamber 12. Thereby the flow rate through the valve, via the fluted parts 16, has been increased, and the force acting on the fluted parts 16 in a direction away from the closed position, due to the high pressure in the first valve chamber 12, has also been increased. Simultaneously, the tapered groove 17, as well as the opening of the second fluid passage 7, have been moved fully into the first valve chamber 12, thereby ensuring maximum flow rate from the first valve chamber 12 to the first fluid passage 6, and thereby ensuring a maximum pressure in the pressure balancing chamber 8.

Figure 5:
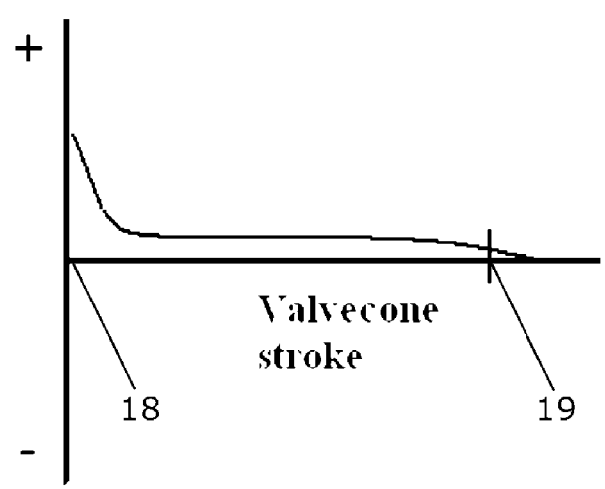
FIG. 5 is a graph illustrating pull force as a function of valve stroke for a flow control valve according to an embodiment of the invention.

FIG. 5 is a graph illustrating resulting pull force acting on the valve member 5 as a function of the position of the valve member 5 (valve stroke), as the valve member 5 is moved between a closed position 18, as illustrated in FIG. 2, and a fully open position 19, as illustrated in FIG. 4. It is evident from FIG. 5 that the pull force remains positive during the movement, and the resulting force pushes the valve member 5 in a direction towards the closed position. It is also evident, that the pull force is substantially constant over a large portion of the movement. The pull force being substantially constant over a large portion of the movement is obtained due to a careful design of the tapered groove 17.

Figure 6:
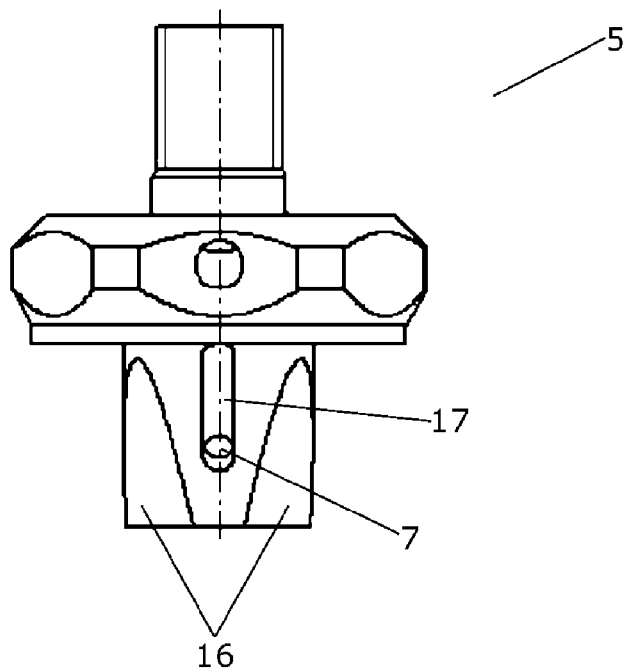
FIGS. 6-9 illustrate a valve member according to an embodiment of the invention.
Figure 7:
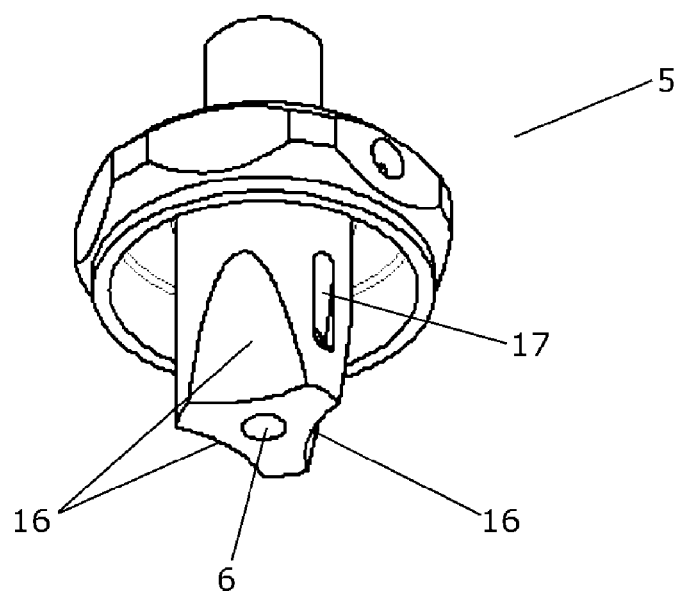
Figure 8:
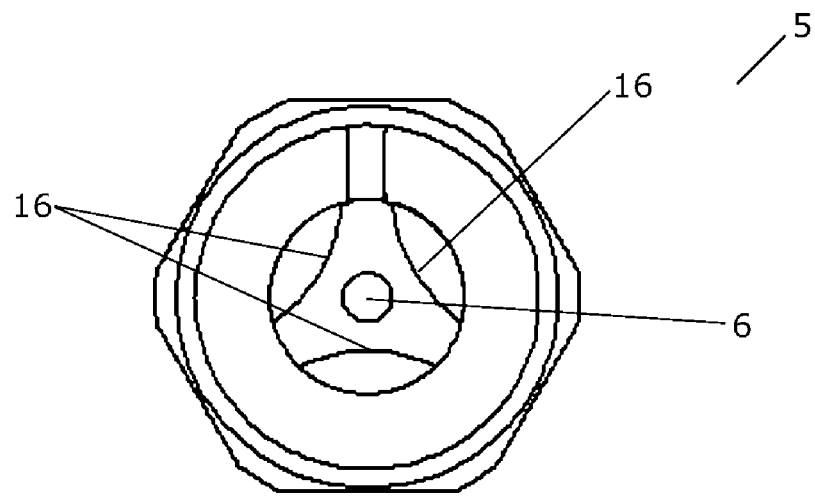
Figure 9:
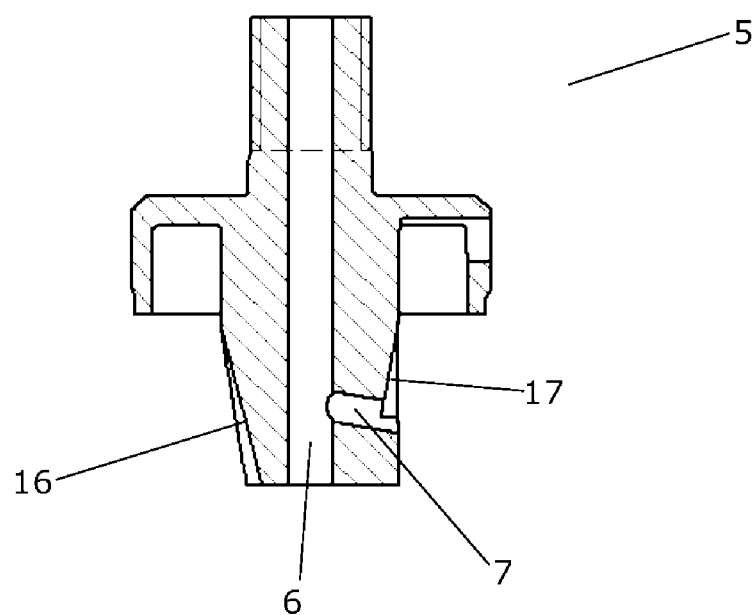

FIGS. 6-9 illustrate a valve member 5 according to an embodiment of the invention. The valve member 5 illustrated in FIGS. 6-9 may, e.g., be used in the valve 1 illustrated in FIGS. 1-4. FIG. 6 is a side view, FIG. 7 is a perspective view, FIG. 8 is an end view, and FIG. 9 is a cross sectional view of the valve member 5.

In FIG. 6 two fluted parts 16, the tapered groove 17 and the opening of the second fluid passage 7 can be seen. In FIG. 7 all three fluted parts 16 can be seen, as well as the tapered groove 17 and the first fluid passage 6. In FIG. 8 it is evident that the first fluid passage 6 extends all the way through the valve member 5, and all three fluted parts 16 can be seen. In FIG. 9 the tapered groove 17 can be seen, and it is evident that the second fluid passage 7 extends through the valve member 5, establishing a fluid connection to the first fluid passage 6. It can also be seen that the first fluid passage 6 extends all the way through the valve member 5.

Although various embodiments of the present invention have been described and shown, the invention is not restricted thereto, but may also be embodied in other ways within the scope of the subject-matter defined in the following claims.

What is claimed is:

1. A flow control valve for a refrigeration system, the valve comprising:
    a valve body defining a fluid inlet, a fluid outlet and a fluid passage between said fluid inlet and said fluid outlet,
    a valve port having a substantially cylindrical inner circumference arranged to receive a protruding portion of a valve member,
    a first valve chamber arranged at a first side of the valve port, and in fluid connection with the fluid inlet,
    a second valve chamber arranged at a second, opposite, side of the valve port, and in fluid connection with the fluid outlet,
    a valve member arranged in an interior part of said valve body, said valve member comprising a protruding portion having a substantially cylindrical outer circumference corresponding to the inner circumference of the valve port, said valve member being movable between a closed position, thereby preventing a fluid flow from the first valve chamber to the second valve chamber, and an open position in which such a fluid flow is allowed, said protruding portion also having at least one fluted part, said at least one fluted part defining fluid passage along the at least one fluted part when the valve member is in the open position,
    wherein the valve member is provided with at least one first fluid passage extending through the valve member between the second valve chamber and a pressure balancing chamber, and at least one second fluid passage establishing a fluid connection between the first valve chamber and the first fluid passage, said second fluid passage having an opening arranged on the substantially cylindrical part of the protruding portion of the valve member.

2. The flow control valve according to claim 1, wherein the valve member further has a groove formed in a region of the outer circumference comprising the opening of the second fluid passage.

3. The flow control valve according to claim 2, wherein the groove is tapered.

4. The flow control valve according to claim 3, wherein the groove extends along a substantially axial direction of movement of the valve member between the closed position and the open position.

5. The refrigeration system comprising a compressor, a condenser, an evaporator and a flow control valve according to claim 3, wherein said flow control valve being arranged to control a flow of fluid supplied to the evaporator.

6. The flow control valve according to claim 2, wherein the groove extends along a substantially axial direction of movement of the valve member between the closed position and the open position.

7. The refrigeration system comprising a compressor, a condenser, an evaporator and a flow control valve according to claim 6, wherein said flow control valve being arranged to control a flow of fluid supplied to the evaporator.

8. The refrigeration system comprising a compressor, a condenser, an evaporator and a flow control valve according to claim 2, wherein said flow control valve being arranged to control a flow of fluid supplied to the evaporator.

9. The flow control valve according to claim 1, wherein the fluted part(s) of the protruding portion of the valve member has/have a substantially parabolic shape.

10. The refrigeration system comprising a compressor, a condenser, an evaporator and a flow control valve according to claim 9, wherein said flow control valve being arranged to control a flow of fluid supplied to the evaporator.

11. The flow control valve according to claim 1, wherein the first valve chamber and the valve port are defined by an element which is detachably mounted on the flow control valve.

12. The flow control valve according to claim 11, wherein fluid flow from the fluid inlet to the first valve chamber takes place via one or more cut-outs formed in a wall part of the element.

13. The refrigeration system comprising a compressor, a condenser, an evaporator and a flow control valve according to claim 12, wherein said flow control valve being arranged to control a flow of fluid supplied to the evaporator.

14. The refrigeration system comprising a compressor, a condenser, an evaporator and a flow control valve according to claim 11, wherein said flow control valve being arranged to control a flow of fluid supplied to the evaporator.

15. The flow control valve according to claim 1, further comprising an actuator for causing movement of the valve element.

16. The refrigeration system comprising a compressor, a condenser, an evaporator and a flow control valve according to claim 15, wherein said flow control valve being arranged to control a flow of fluid supplied to the evaporator.

17. A refrigeration system comprising a compressor, a condenser, an evaporator and a flow control valve according to claim 1, wherein said flow control valve being arranged to control a flow of fluid supplied to the evaporator.

18. A valve member for a flow control valve, said valve member comprising a protruding portion having a substantially cylindrical outer circumference corresponding to an inner circumference of a valve port, said protruding portion having at least one fluted part, wherein the valve member is provided with at least one first fluid passage extending through the valve member, and at least one second fluid passage establishing a fluid connection between the outer circumference of the valve member and the first fluid passage, said second fluid passage having an opening arranged on the substantially cylindrical part of the protruding portion of the valve member.

* * * * *